United States Patent
Castelli et al.

(10) Patent No.: US 11,866,188 B2
(45) Date of Patent: Jan. 9, 2024

(54) ELECTRIC MOTOR NACELLE FOR A VERTICAL TAKE-OFF AND LANDING AIRCRAFT AND AIRCRAFT COMPRISING SUCH A NACELLE

(71) Applicant: SAFRAN ELECTRICAL & POWER, Blagnac (FR)

(72) Inventors: Christophe Castelli, Moissy Cramayel (FR); Valentin Antoine Maxime Mesnil, Moissy Cramayel (FR); Abdoulahad Thiam, Moissy Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 129 days.

(21) Appl. No.: 17/768,100

(22) PCT Filed: Oct. 7, 2020

(86) PCT No.: PCT/FR2020/051760
§ 371 (c)(1),
(2) Date: Apr. 11, 2022

(87) PCT Pub. No.: WO2021/069834
PCT Pub. Date: Apr. 15, 2021

(65) Prior Publication Data
US 2023/0242266 A1    Aug. 3, 2023

(30) Foreign Application Priority Data
Oct. 10, 2019   (FR) ......................................1911243

(51) Int. Cl.
*B64D 29/00* (2006.01)
*B64D 27/24* (2006.01)
(Continued)

(52) U.S. Cl.
CPC ............ *B64D 29/00* (2013.01); *B64D 27/24* (2013.01); *B64D 27/26* (2013.01); *B64D 33/08* (2013.01); *B64C 29/0008* (2013.01)

(58) Field of Classification Search
CPC ........ B64D 29/00; B64D 27/24; B64D 27/26; B64D 33/08; B64C 29/0008
See application file for complete search history.

(56) References Cited

U.S. PATENT DOCUMENTS
2018/0051716 A1* 2/2018 Cheung ................... F04D 25/02

FOREIGN PATENT DOCUMENTS
EP    2 774 853 A1    9/2014
FR    2 871 136 A1    12/2005

OTHER PUBLICATIONS

International Search Report as issued in International Patent Application No. PCT/FR2020/051760, dated Nov. 30, 2020.

* cited by examiner

*Primary Examiner* — Justin M Benedik
(74) *Attorney, Agent, or Firm* — Pillsbury Winthrop Shaw Pittman LLP

(57) ABSTRACT

An electric motor nacelle for a vertical take-off and landing (VTOL) aircraft includes a fairing wherein an electric motor is housed equipped with at least one propeller extending outwards from a top face of the fairing, and a cooling device designed to cool the electric motor when the aircraft is in take-off, cruise and landing phases and including a reversible coolant fluid supply and exhaust manifold, designed, alternately: in the cruise phase, to receive a stream of cold fluid generated by the movement of the aircraft and to convey this stream of fluid, through the motor, towards an outlet situated opposite the propeller, and in take-off or (Continued)

landing phase, to receive a stream of hot fluid transmitted by the propeller and having passed through the motor.

11 Claims, 2 Drawing Sheets

(51) Int. Cl.
*B64D 27/26* (2006.01)
*B64D 33/08* (2006.01)
*B64C 29/00* (2006.01)

[Fig. 1]
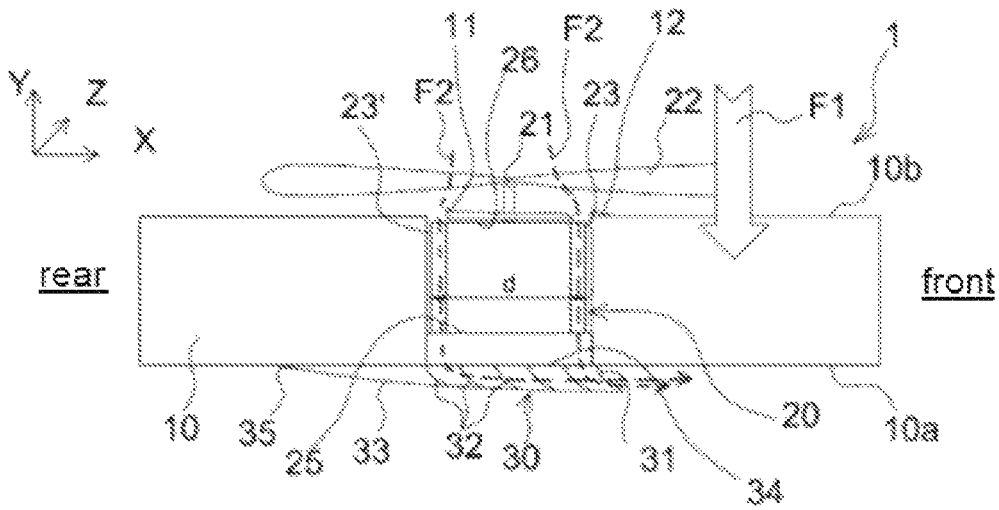
[Fig. 2]
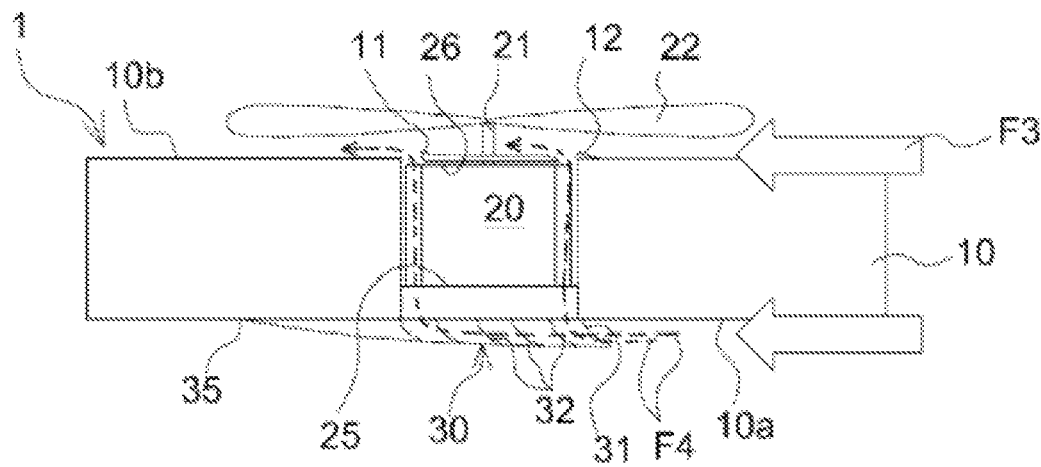
[Fig. 3]
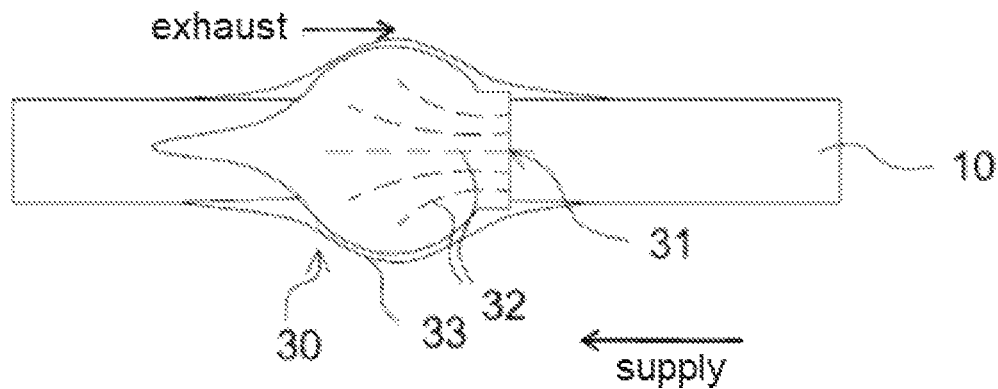

[Fig. 4]
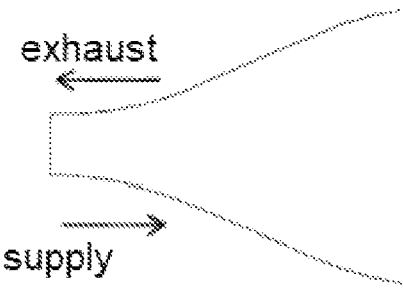
[Fig. 5]
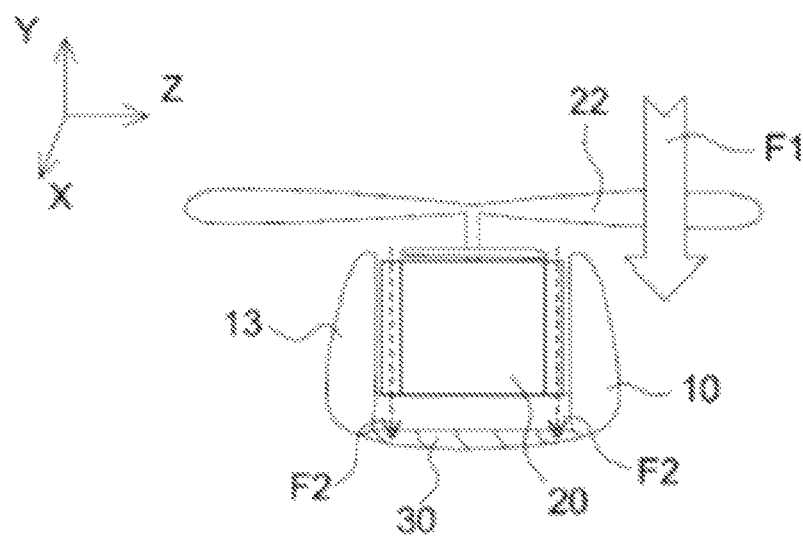
[Fig. 6]
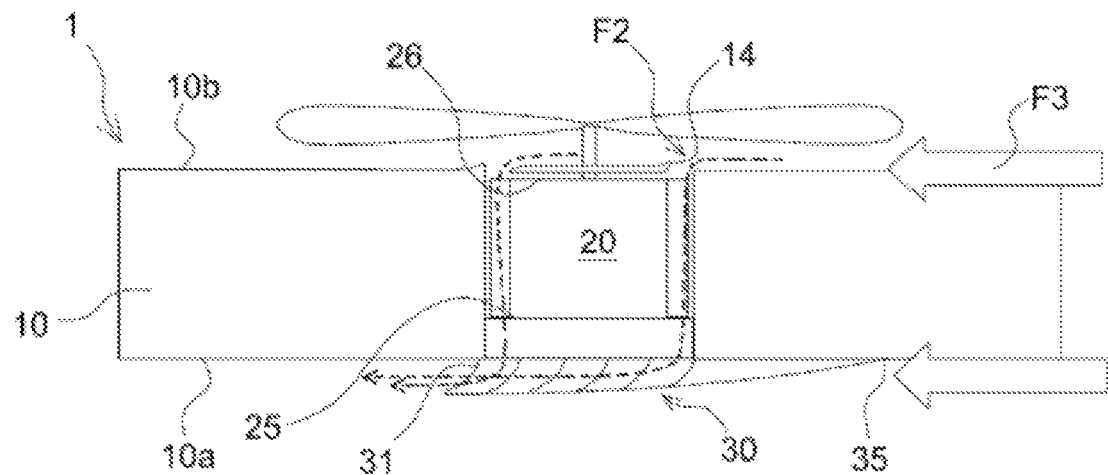

ELECTRIC MOTOR NACELLE FOR A VERTICAL TAKE-OFF AND LANDING AIRCRAFT AND AIRCRAFT COMPRISING SUCH A NACELLE

CROSS-REFERENCE TO RELATED APPLICATIONS

This application is the U.S. National Stage of PCT/FR2020/051760, filed Oct. 7, 2020, which in turn claims priority to French patent application number 1911243 filed Oct. 10, 2019. The content of these applications are incorporated herein by reference in their entirety.

TECHNICAL FIELD OF THE INVENTION

The present invention relates to an electric motor nacelle for a vertical take-off and landing aircraft (VTOL). It also relates to a VTOL equipped with such a nacelle.

The invention has applications in the field of aeronautics and, in particular, in the field of VTOL electric motors.

TECHNOLOGICAL BACKGROUND OF THE INVENTION

Aeronautical manufacturers seek to develop vertical take-off and landing (VTOL) aircraft that can be free of the runways usually required for the take-off and landing of conventional aircraft. There are several types of VTOLs listed according to the motors used. Certain VTOLs, simply called aircraft hereinafter, are equipped with several lift motors positioned along a vertical axis to ensure the take-off and landing of the aircraft and tilt motors positioned conventionally along a horizontal axis to ensure the flight of the aircraft in cruise mode.

The tilt motors of these types of aircraft are generally mounted on beams attached to the fuselage of the aircraft or under the wing of the aircraft in such a way that their axes of rotation are parallel to the fuselage of said aircraft.

The lift motors, generally more numerous than the tilt motors for reasons of more substantial power when elevating than cruising, are mounted on beams attached to the fuselage of the aircraft or on the wing of the aircraft, generally downstream or, on the contrary, upstream from the tilt motors. Each one of the lift motors is an electric motor that comprises an axis of rotation substantially perpendicular to the plane of the wing and extended by a propeller with several blades. Lift motors have to be cooled during the entire duration of the flight, during the elevation phases (take-off and landing) as well as during the cruise phase. Indeed, although in the cruise phase the propellers do not rotate, lift motors even so have to be cooled so that the heating caused by the take-off has dissipated at the time of landing.

More precisely, during the elevation phases, i.e. take-off and landing, the propeller rotates and the aircraft is lifted, which generates a vertical stream of air entering into the lift motor by its top face 26 facing the propeller. The air passes through the motor and cools it via exchange surfaces, of the cooling fins type, mounted on the motor. During the cruise phase, the aircraft is propelled in a substantially horizontal direction by the tilt motors. The stream of air generated by the movement of the aircraft is then horizontal. As the propellers of the lift motors are stopped, the stream of air generated by the movement of the aircraft licks the outside surfaces of the lift motors without however penetrating inside said motors and accessing the exchange surfaces.

Currently, so that the air generated by the movement of the aircraft marginally cools the lift motors during the cruise phase, it was chosen by aircraft manufacturers to leave said lift motors outside the structure of the aircraft and therefore to not careen them. However, although the absence of fairing allows the stream of air to cool the lift motors by contact with their outside surfaces, this absence of fairing also has for effect to generate aerodynamic losses. Indeed, as is known in the field of aeronautics, any part or portion of a part that does not satisfy an aerodynamic profile generates an aerodynamic drag. This aerodynamic drag is all the more so substantial that the part or portion of part is positioned perpendicularly to the plane of the aircraft. The aerodynamic drags generated by each one of the lift motors have for consequence to generate overconsumption of the power required for the flight of the aircraft and this overconsumption of power, in addition to being expensive, has a direct impact on the autonomy of the motor, when the motor is an electric motor.

Other VTOLs are equipped, instead of lift motors, with so-called "steerable" motors. These steerable motors have the advantage of being able to pivot on themselves in such a way that their axes of rotation can switch from a substantially vertical position during the elevation phases to a substantially horizontal position during the cruise phase. Consequently, regardless of the flight phase, the axis of these steerable motors is always in the stream of air generated by the movement of the aircraft. Steerable motors can therefore be correctly cooled in the elevation phase as well as in the cruise phase. However, these steerable motors are more difficult to implement than lift motors and require a relatively complex control system, which has for consequence a higher cost of manufacturing.

There is therefore, for lift motors, a need for a fairing (or careening) that makes it possible to limit the aerodynamic losses generated by said motors while still making it possible to cool said motors during the elevation phases as well as during the cruise phase.

SUMMARY OF THE INVENTION

To respond to the problems mentioned hereinabove of the aerodynamic losses generated by the lift motors and of the cooling of these lift motors during the elevation and cruise phases, the applicant proposes a VTOL electric motor nacelle, preferably of the airplane type, provided with a reversible coolant fluid supply and exhaust manifold.

According to a first aspect, the invention relates to an electric motor nacelle for a vertical take-off and landing (VTOL) aircraft comprising:
- a fairing wherein an electric motor is housed equipped with at least one propeller extending outwards from a top face of the fairing, and
- a cooling device designed to cool the motor when the aircraft is in take-off, cruise and landing phases and comprising a reversible coolant fluid supply and exhaust manifold, designed, alternately:
  - in the cruise phase, to receive a stream of cold fluid generated by the movement of the aircraft and to convey this stream of fluid, through the motor, towards an outlet situated opposite the propeller, and
  - in the take-off or landing phase, to receive a stream of hot fluid transmitted by the propeller and having passed through the motor.

This electric motor nacelle allows said motor to be integrated into a fairing with an aerodynamic profile while still being cooled in the cruise phase as well as in the elevation phase.

By definition, the stream of hot fluid transmitted by the propeller is a stream of cooling fluid transmitted by the propeller and heated during the passage thereof through the motor by contact with heat exchange surfaces of said motor.

Advantageously, the reversible manifold is positioned on a bottom face of the fairing, opposite the top face.

In addition to the characteristics that have just been mentioned in the preceding paragraph, the nacelle according to an aspect of the invention can have one or more additional characteristics among the following, taken individually or according to any technically permissible combinations:

- the reversible manifold is an aerodynamic profile chamber provided with an intake and exhaust opening of the fluid and with a plurality of distribution channels of the fluid.
- the distribution channels are distributed in an internal structure of the reversible manifold between the intake and exhaust opening and a bottom face of the motor in such a way as to convey the stream of fluid from the opening to the heat exchange surfaces of the motor or from the bottom face of the motor to the opening of the reversible manifold.
- the reversible manifold has a scoop shape in the fairing.
- the reversible manifold has a NACA intake shape in the fairing.
- the fairing surrounding the electric motor comprises an aerodynamic shape extending by flaring from the top face to the bottom face, in such a way as to generate a depression between the top face and the bottom face.
- the top face of the fairing surrounding the electric motor comprises at least one boss generating a Venturi effect.
- the exchange surfaces of the electric motor extend substantially vertically between the bottom face and the top face of the electric motor.
- the opening of the reversible manifold is directed towards the front of the fairing.

Another aspect of the invention relates to a VTOL equipped with such an electric motor nacelle.

BRIEF DESCRIPTION OF THE FIGURES

Other advantages and characteristics of the invention shall appear when reading the following description, shown in the figures wherein:

FIG. 1 shows a diagrammatical side view of an example of an electric motor nacelle for VTOL according to the invention, in the elevation phase;

FIG. 2 shows a diagrammatical side view of the example of a nacelle of FIG. 1, during the cruise phase;

FIG. 3 shows a diagrammatical bottom view of an example of a reversible coolant fluid supply and exhaust manifold of the nacelle according to the invention;

FIG. 4 shows a diagrammatical view of an example of an opening of the reversible manifold according to the invention, FIG. 5 shows a diagrammatical front view, as a cross-section, of another example of an electric motor nacelle for VTOL according to the invention;

FIG. 6 shows a diagrammatical side view of another example of an electric motor nacelle for VTOL, during the cruise phase, wherein the opening of the reversible manifold is directed towards the rear of the fairing.

DETAILED DESCRIPTION

An embodiment of an electric motor nacelle for VTOL configured to limit the aerodynamic drag and allow for a cooling of said motor is described in detail hereinafter, in reference to the accompanying drawings. This example shows the characteristics and advantages of the invention. It is however reminded that the invention is not limited to this example.

In the figures, identical elements are marked with identical references. For reasons of legibility of the figures, the size scales between the elements shown are not respected.

In FIGS. 1 and 2, an example of a lift motor nacelle for VTOL—also called aircraft—is schematically shown according to a longitudinal cross-section, i.e. along a plane XY where X is the axis of displacement of the aircraft in cruise phase and Y is the axis of displacement of the aircraft in the elevation phases. As shown in these FIGS. 1 and 2, the nacelle 1 according to the invention comprises a fairing 10 wherein the lift motor 20 is inserted.

The fairing 10 is a fairing with an aerodynamic profile adapted to limit the aerodynamic losses due to the presence of the lift motor. The fairing can have, for example, an oval shape, an oblong shape or any symmetrical, asymmetrical, convex or biconvex aerodynamic profile shape.

The lift motor 20 is integrated into the fairing 10 in such a way that its axis of rotation 21, which carries one or more propellers 22, is parallel to the axis Y. The lift motor of the VTOL is an electric motor that comprises an axis of rotation substantially perpendicular to the plane of the wing of the aircraft and which is overmounted by a propeller The propeller 22 extends outside a top face 10b of the fairing 10 in such a way that the plane wherein the blades of the propeller are in rotation is substantially parallel to said top face of the fairing.

The lift motor 20 includes, like any electric motor, various internal components of which a rotor mounted about the axis of rotation and a stator mounted about the rotor, the assembly able to be protected by a casing. The stator and/or the casing can comprise, on the external surface(s), heat exchange surfaces such as, for example, cooling fins, that make it possible, by heat exchanges between a coolant fluid and said exchange surfaces, to cool the electric motor.

The lift motor can be a motor equipped with its electronics (called Smart Motor). In this case, the electronics also take advantage of the cooling obtained thanks to the device of the invention.

The coolant fluid can be air or air combined with another fluid, such as oil. In the rest of the description, the invention shall be described in the case where the fluid is air, being understood that the means implemented in the framework of the invention are identical for air alone or for a combination of air and another fluid, an air/fluid exchanger then being provided inside the fairing 10.

The nacelle 1 according to the invention comprises a reversible manifold 30 for the supply and the exhaust of the cooling air, housed in the fairing 10. According to certain embodiments, this reversible manifold 30 extends over at least a portion of the bottom face 10a of the fairing, this bottom face 10a being the face of the nacelle facing the ground, i.e. the face opposite the top face 10b above which the propeller or propellers 22 extend. In these embodiments, the opening of the reversible manifold 30 can be conveyed either towards the rear of the fairing, or towards the front of the fairing. In other embodiments, the reversible manifold 30 extends over at least a portion of the top face 10b of the fairing, this top face 10b being the face of the nacelle on which the propeller or propellers 22 extend. In these embodiments, the reversible manifold 30 is provided with holes that allow for the passage of the air in the take-off and landing phases, these embodiments having for advantage to generate even less drag than the embodiments with the reversible manifold on the bottom face.

The reversible manifold 30 is a chamber formed inside the fairing 10. This chamber comprises an opening 31 for the intake and exhaust of the air, an exterior wall 33 and, possibly, an interior wall 34. When it exists, the interior wall 34 is in contact with the lift motor 20 and is equipped with orifices that allow for the passage of air. The exterior wall 33 extends over a length at least equal to the diameter "d" of the lift motor 20 and, preferably, greater than this diameter d. The exterior wall 33 has an aerodynamic profile between the intake and exhaust opening 31 of the air and a closed end 35 of the chamber. In certain embodiments, the exterior wall 33 is formed by the bottom face 10a of the fairing. In other embodiments, the exterior wall 33 is a wall specific to the reversible manifold; in this case, the bottom face 10a of the fairing comprises an orifice facing the lift motor 20 and the reversible manifold 30 is then added on the bottom face 10a of the fairing to which it is fastened by any means of fastening conventionally used in the field of aeronautics.

According to the embodiment of FIGS. 1 and 2, the reversible manifold 30 is mounted under the lift motor 20 in such a way that its opening 31 is upstream from the stream of air generated by the movement of the aircraft, i.e. the opening 31 is directed towards the front of the fairing and the closed end is directed towards the rear of said fairing. The term "front of the fairing" refers to the end zone of the fairing located upstream from the stream of air generated by the movement of the aircraft, i.e. the zone that is closest to the front of the aircraft. On the contrary, the term "rear of the fairing" refers to the end zone of the fairing located downstream from the stream of air generated by the movement of the aircraft, i.e. the zone that is closest to the rear of the aircraft.

The exterior wall 33 and/or the interior wall 34 of the reversible manifold 30 comprise a plurality of air distribution channels 32. These air distribution channels 32 can be grooves dug in the material forming the inner face of the walls 33, 34 or formed by adding edges (for example by welding, gluing or brazing) on the inner face of said walls 33, 34. The air distribution channels 32 can also be made from a single piece with the assembly of reversible manifold by casting, moulding, extrusion, stamping, rolling, additive manufacturing or any other method of manufacturing suitable for the manufacturing of the fairing.

The air distribution channels 32 extend from the intake and exhaust opening 31 of the air to the lift motor 20 by following a predefined path, designed to orient both the stream of air from the opening 31 to the lift motor 20 and from the lift motor 20 to the opening 31. In particular, the air distribution channels 32 are spread over the walls 33, 34 of the reversible manifold in such a way that the stream of air is oriented from the opening 31 towards zones wherein the heat exchange surfaces (in particular the cooling fins) are located such as for example the peripheral zones 23, 23' of the lift motor.

An example of a reversible manifold 30 is shown, according to a bottom view, in FIG. 3. In this example, the reversible manifold 30 has the shape of a pointed sphere comprising an open base forming the opening 31 and a point forming the closed end 35. The air distribution channels 32 are deployed in the internal cylindrical zone of the chamber, from the opening 31 and to the inlet of the peripheral zones 23, 23' containing the heat exchange surfaces. Note that the reversible manifold 30 can have all sorts of shapes, as long as these shapes have an aerodynamic profile. In particular, the reversible manifold 30 can have the shape of a scoop or a NACA grip, such as the shape schematically shown in FIG. 4. The term "NACA grip" means a flush air intake of which the shape, originally developed by the National Advisory Committee for Aeronautics, allows the air to penetrate into an internal conduit with a minimal disturbance of the flow rate. A NACA grip generally includes a shallow ramp with curved walls, embedded in the surface exposed to the air, namely the fairing. Many shapes of NACA grips can be considered. In the examples where the reversible manifold 30 has the shape of a NACA unit, the air distribution channels 32 can extend from the ramp of the NACA grip. The number of air distribution channels 32 and their trajectories of course depend on the dimensions of the lift motor, but also on the location of the heat exchange surfaces and on the shape of the reversible manifold. The channels can be, for example in the number of 5, over a height of 15 mm, with a variable spacing that begins every 15 mm in order to widen in such a way as to better distribute the stream of air to the heat exchangers.

The reversible manifold 30 such as has just been described makes it possible, on the one hand, to supply the lift motor 20 with cool air during the cruise phase and, on the other hand, to remove the hot air from said motor during the elevation phases. In the cruise phase, the reversible manifold 30 collects and drives (or conveys) the air towards the motor in order to ensure the cooling thereof and in the elevation phase, it allows the air to escape without generating any aerodynamic disturbance for the aircraft.

As explained hereinabove, the elevation phases are the take-off phases and the landing phases of the aircraft. During these elevation phases, the lift motors are operating and their propellers are rotating. As shown in FIG. 1, the stream of air generated by the propeller and by the movement of the aircraft during an elevation phase, for example take-off, is oriented in a substantially vertical direction (i.e. in the direction Y). The cool stream of air, represented by the solid line arrow F1, therefore penetrates into the lift motor 20 by the top surface 10b of the nacelle 1 and is pushed inside said motor by the propeller 22 in rotation. The stream of cooling air then follows the trajectory represented by the dotted arrows F2 in FIG. 1. This stream of air passes through the lift motor 20 by licking the heat exchange surfaces of said motor in such a way that the motor is cooled. The stream of hot air—i.e. the stream of air heated by the contact with the heat exchange surfaces of the motor—escapes from the motor by its bottom face 25 (i.e. the face opposite the face receiving the propeller 22) and is removed outside the fairing 10 by the reversible manifold 30 and in particular by the air distribution channels 32 that receive the hot air at the motor outlet 20 and directs it towards the opening 31. The removal of the hot air by the air distribution channels 32 and the opening 31 makes it possible to not generate any aerodynamic disturbance and therefore to not disturb the ascension or the descent of the aircraft.

The heat exchange surfaces can be, for example, cooling fins disposed in the peripheral zones 23, 23' of the lift motor 20. Conventionally, these fins can be disposed horizontally, i.e. substantially perpendicularly to the axis 21 of the lift motor. According to an alternative, the cooling fins are disposed substantially vertically, i.e. in a direction substantially parallel to the axis 21 of the lift motor or forming an angle less than 45° with respect to said axis of the motor. Alternatively, the heat exchange surfaces can be ducts, pins, a tubing or any other type of heat exchanger known in the field of aerodynamics.

According to certain embodiments, the fairing 10 comprises, in a zone close to the lift motor, bosses 11, 12, 13 adapted to generate a Venturi effect. First bosses 11, 12 can be, for example, portions of the top face 26 that have a positive curvature in the vicinity of the air inlets in the lift motor. Second bosses 13, shown in FIG. 5, can be, for example, lateral portions of the fairing having a rounded and/or flared shape in the plane YZ.

In elevation phases, the second bosses 13 have for effect to accelerate the speed of the stream of air at the inlet in the lift motor 20, which generates a depression since the pressure P1 at the inlet in the motor is greater than the pressure P2 at the outlet of the reversible manifold 30. This depression has for consequence to facilitate the passage of the stream of air through the lift motor.

During the cruise phase, shown in FIG. 2, the aircraft moves in a substantially horizontal direction (direction of X) and the propellers 22 of the lift motors are not rotating. The stream of air generated by the movement of the aircraft is oriented in a substantially horizontal direction, represented by the solid line arrows F3. The stream of cool air is therefore oriented in a direction about 90° from the bottom face of the lift motor. This stream of cool air then penetrates into the reversible manifold 30 by the opening 31 and is conveyed towards the bottom face 25 of the lift motor 20 by the air distribution channels 32, as represented by the dotted arrows F4 in FIG. 2. This stream of air driven by the channels 32 then passes through the lift motor 20 by licking the heat exchange surfaces of said motor in such a way that the motor is cooled. The stream of hot air—i.e. the stream of air heated by the contact with the heat exchange surfaces of the motor—escapes from the lift motor by its top face 26. As the propeller 22 is not operating, the hot air is removed by running along the top face 10b of the fairing. Any aerodynamic disturbances that the outlet of the air in this zone could represent are much less than those generated by the propeller 22 and its axis 21 and thus do not further disturb the flight of the aircraft.

In this cruise phase, the reversible manifold 30 operates like a scoop that captures the air and transmits it to the lift motor and in particular to the heat exchange surfaces of said lift motor.

In the embodiments where the fairing 10 comprises, in a zone close to the lift motor, first bosses 11, 12, a Venturi effect is generated by said bosses. These first bosses 11, 12 can, for example, be distributed in the following way:

a boss 12 on the top face 10b of the fairing, in a zone between the front of the fairing 10 and the lift motor 20, for example immediately before the front peripheral zone 23 of the lift motor 20, and a boss 11 on the top face 10b of the fairing, in a zone covering the lift motor 20, for example immediately before the rear peripheral zone 23' of the lift motor 20.

These first bosses 11, 12 have for effect to accelerate the speed of the stream of air at the outlet of the lift motor 20 (i.e. in the vicinity of the top face 26 of said motor), which generates a depression since the pressure P1 at the outlet of the motor is greater than the pressure P2 at the inlet of the reversible manifold 30. This depression has for consequence to facilitate the passage of the stream of air through the lift motor 20.

FIG. 6 shows a schematical longitudinal cross-section view of an example of a lift motor nacelle for VTOL, according to another embodiment. In this embodiment, the nacelle 1 is identical to the nacelle described in liaison with FIG. 1, except that the reversible manifold 30 is mounted under the lift motor 20 in such a way that its opening 31 is downstream from the stream of air generated by the movement of the aircraft, i.e. the closed end is directed towards the front of the aircraft and the opening 31 is directed towards the rear of said aircraft.

In this embodiment, the depression created at the outlet of the reversible manifold 30 will aspirate the air because the pressure P1 at the inlet of the lift motor 20 is greater than the pressure P2 at the outlet of the reversible manifold 30. To increase this depression, the top face 10b of the fairing can comprise, for example, third bosses 14. These third bosses 14 can be located on the top face 10b of the fairing, in a zone covering the lift motor 20, for example immediately after the front peripheral zone 23 of the lift motor 20. Such bosses 14, via a suitable shape, favour the inlet of the stream of air into the lift motor 20.

Regardless of the embodiment of the lift motor nacelle described hereinabove, an additional air circulation device can be installed in the nacelle in order to increase the stream of air or the speed of the stream of air passing though the lift motor. This circulation device can be, for example, a fan, a compressor or any other device that allows for a circulation of the air inside the nacelle. This circulation device can be an independent device or a device controlled in rotation by the lift motor or by the axis of the propeller.

Although described through a certain number of examples, alternatives and embodiments, the VTOL electric motor nacelle according to the invention comprises various alternatives, modifications and improvements that will appear as obvious to those skilled in the art, being understood that these alternatives, modifications and improvements are part of the scope of the invention.

The invention claimed is:

1. An electric motor nacelle for a vertical take-off and landing aircraft comprising:
    a fairing wherein an electric motor is housed equipped with at least one propeller extending outwards from a top face of the fairing, and
    a cooling device designed to cool the electric motor when the aircraft is in take-off, cruise and landing phases and comprising a reversible coolant fluid supply and exhaust manifold, adapted, alternately:
        in the cruise phase, to receive a stream of cold fluid generated by the movement of the aircraft and to convey said stream of fluid, through the motor, towards an outlet situated opposite the propeller, and
        in the take-off or landing phase, to receive a stream of cooling fluid transmitted by the propeller and having passed through the motor, the stream of fluid being heated by contact with heat exchange surfaces of said motor.

2. The electric motor nacelle according to claim 1, wherein the reversible manifold is positioned on a bottom face of the fairing, opposite the top face.

3. The electric motor nacelle according to claim 1, wherein the reversible manifold is an aerodynamic profile chamber provided with an intake and exhaust opening of the fluid and with a plurality of distribution channels of the fluid.

4. The electric motor nacelle according to claim 3, wherein the distribution channels are distributed in an internal structure of the reversible manifold between the intake and exhaust opening and a bottom face of the motor in such a way as to convey the stream of fluid from the opening to the heat exchange surfaces of the motor or from the bottom face of the motor to the opening of the reversible manifold.

5. The electric motor nacelle according to claim 4, wherein the exchange surfaces of the electric motor extend substantially vertically between the bottom face and a top face of the electric motor.

6. The electric motor nacelle according to claim 3, wherein the opening of the reversible manifold is directed towards a front of the fairing.

7. The electric motor nacelle according to claim 1, wherein the reversible manifold has a scoop shape in the fairing.

8. The electric motor nacelle according to claim 1, wherein the reversible manifold has a NACA grip shape in the fairing.

9. The electric motor nacelle according to claim 1, wherein the fairing surrounding the electric motor comprises an aerodynamic shape extending by flaring from a top face to a bottom face of said motor, in such a way as to generate a negative pressure between the top face and the bottom face.

10. The electric motor nacelle according to claim 1, wherein the top face of the fairing surrounding the electric motor comprises at least one boss generating a Venturi effect.

11. A vertical take-off and landing aircraft comprising at least one electric motor nacelle according to claim 6.

* * * * *